United States Patent [19]
Ginzboorg et al.

[11] Patent Number: 6,047,051
[45] Date of Patent: Apr. 4, 2000

[54] IMPLEMENTATION OF CHARGING IN A TELECOMMUNICATIONS SYSTEM

[75] Inventors: Philip Ginzboorg, Espoo; Jan-Erik Ekberg, Helsinki; Antti Ylä-Jääski, Espoo, all of Finland

[73] Assignee: Nokia Telecommunications Oy, Espoo, Finland

[21] Appl. No.: 08/881,391

[22] Filed: Jun. 24, 1997

[30] Foreign Application Priority Data

Nov. 11, 1996 [FI] Finland ................................... 964524

[51] Int. Cl.⁷ .................................................. H04M 15/00
[52] U.S. Cl. ...................... 379/130; 379/112; 379/91.01; 705/40; 235/380
[58] Field of Search ........................... 379/111–120, 140, 379/207, 91.01, 201, 229, 230, 130; 370/385; 705/40–43; 380/4; 235/375, 380, 380.5, 381

[56] References Cited

U.S. PATENT DOCUMENTS

| | | |
|---|---|---|
| 5,181,107 | 1/1993 | Rhoades . |
| 5,524,142 | 6/1996 | Lewis et al. . |
| 5,692,132 | 11/1997 | Hogan ....................................... 705/40 |
| 5,701,152 | 12/1997 | Chen ............................................ 348/3 |
| 5,727,163 | 3/1998 | Bezos ...................................... 235/379 |
| 5,729,594 | 3/1998 | Klingman ............................... 379/91.01 |
| 5,737,414 | 4/1998 | Walker et al. ............................... 380/4 |
| 5,745,556 | 4/1998 | Ronen ...................................... 379/127 |
| 5,794,221 | 8/1998 | Egendorf .................................... 705/40 |

FOREIGN PATENT DOCUMENTS

| | | |
|---|---|---|
| 0 647 052 | 4/1995 | European Pat. Off. . |
| 0 647 052 A1 | 4/1995 | European Pat. Off. . |
| 0 753 949 A1 | 1/1997 | European Pat. Off. . |

*Primary Examiner*—Paul Loomis
*Attorney, Agent, or Firm*—Altera Law Group LLC

[57] ABSTRACT

The invention concerns a method for the implementation of charging in a telecommunications system including customer terminals used by customers for ordering services and servers for providing services to customers. In order to implement the charging of services easily especially in a multimedia environment, at least one separate billing server is used in the network so that each customer terminal has a dedicated billing server. A contract message is sent to the customer terminal stating that the customer must make a contract on the selected service, and the customer's acceptance of the contract is sent from the customer terminal to the billing server in the network. The billing servers of the network are used for transferring charging records to the billing system so that the transfer of the charging record(s) concerning the selected service involves at least one billing server.

29 Claims, 7 Drawing Sheets

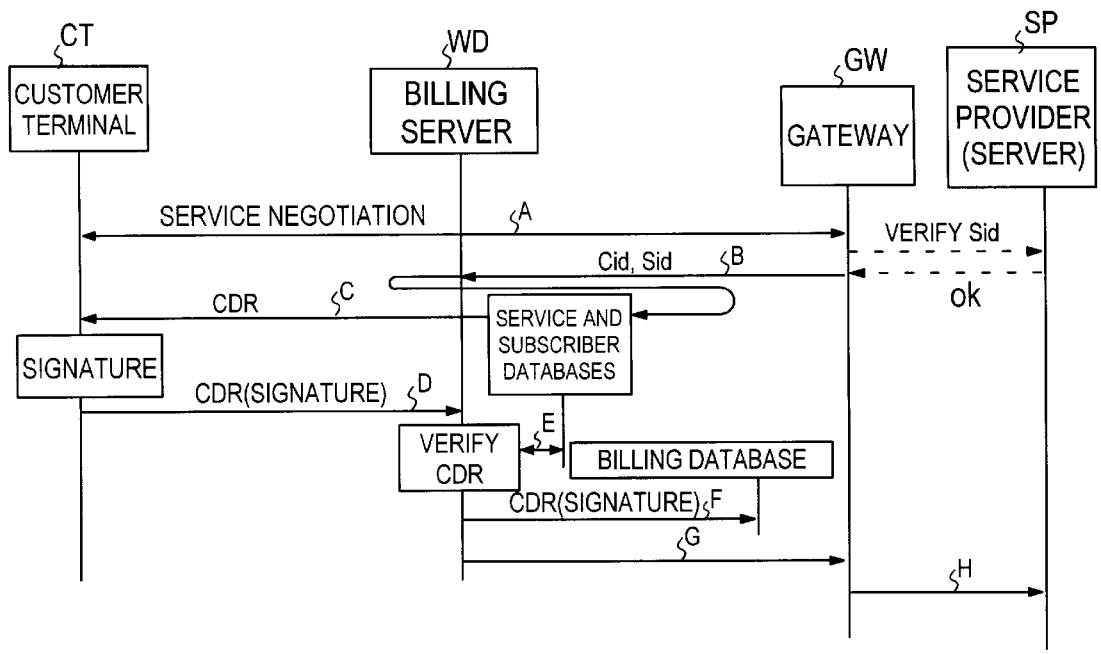

6,047,051

IMPLEMENTATION OF CHARGING IN A TELECOMMUNICATIONS SYSTEM

FIELD OF THE INVENTION

The invention is related in general to the implementation of charging in a telecommunications system and in particular to the implementation of charging for multimedia services.

BACKGROUND OF THE INVENTION

Charging for services is implementation of a contract between a service provider and a customer. In principal, there are two types of charging: distributed and centralized.

In distributed charging the customer pays the vendor each time he/she uses the services provided by the vendor. The payment is made either in cash or by using some other equivalent method. For example, delivery of mail is paid by using stamps. A more recent example of a payment method used in distributed charging is electronic cash. Each "coin" of electronic cash consists of a encrypted binary sequence, which must be verified by the server of a bank.

In centralized charging, either the vendor or a third party monitors the usage of services. The customer is charged periodically, for example, once a month. The bill is based on data gathered during the previous charging period. Three well-known examples of centralized charging are electricity, telephone and credit card charges. Centralized charging consists of three stages. The first stage is the drawing up of a contract between the user and the service provider, on the services and the charging for the services. The second stage is the monitoring (or metering) and storage of usage data. The third stage is the generation and distribution of a bill to the customer. The bill is generated in the billing system on the basis of stored information.

For example, the centralized billing system used in a telephone network is based on a contract between subscribers and the telephone company. The essence of the contract is that the subscriber is given access to telephone services, i.e. he/she can make and receive calls. In return he/she pays the telephone company on the basis of predefined tariffs. Typically, the bills contain charges of two different types: fixed charges and charges for usage. The fixed charges are charged regardless of whether the services are used or not. Charges for usage depend on how many calls a subscriber has made and possibly also on how many calls he/she has received. In order to be able to charge for usage telephone company has to monitor the made and received calls. The monitoring is connection based; it is done by switches in the network.

FIG. 1 illustrates a well-known centralized charging method used in telephone networks by presenting a part of a public telephone network. For each call made, the network switch SW (subscriber's local switch) creates one or several charging records CDR (Charging Data Record). These records are first stored in memory and then sent to a centralized billing system in which they are stored in a mass memory, for example, in a magnetic tape or a hard disk. There may be an additional processing stage between the switch and the billing system. In this stage the charging records are preprocessed, i.e. prepared, for the billing system. The preprocessing may include, for example, a conversion of a tariff class field into another format. The mass memory of a billing system may contain millions of records. These records form the "raw data", which the billing system processes. So the processing of the charging records takes place as a separate batch process at a later date than the date of generating the records. It should be noted that in practice the charging may be much more complicated than the example presented here. For example, in a cellular network each participating cellular network switch may generate charging records. However, the principle of charging is similar to the one presented above.

From now on, the charging records are referred to as "CDR" and the program forming the charging records as the "CDR generator".

The centralized charging of telephone services is based on off-line charging and on the fact that in the network there are CDR generators that record the setup and release events. However, this kind of charging is not technically suitable when multimedia services are offered in the network. There are two basic reasons for this. First, most of the current multimedia services use IP (Internet Protocol), which is used for providing connectionless services. Charging based on telephone network connections is not suitable for this kind of system. Second, it is obvious that the charging for multimedia services must be based on the content of the transferred information. The current telephone network can monitor setup and release events, but it cannot monitor the content of what is being transferred. When using CDR generators, the network operator must choose between two alternatives: either (a) the charging will be based on connections regardless of content or (b) in connection with each delivery, information about the content of the transferred information is retrieved from the service provider. The first alternative means that the operator cannot offer charging for content; the existing centralized billing systems of telephone networks cannot be utilized efficiently. For the customer this means that he/she gets one bill from the operator and, in addition to that, separate bills from each service provider. The second alternative leads to a highly integrated, technically complicated system in which there is much traffic between servers and CDR generators.

SUMMARY OF THE INVENTION

The purpose of the invention is to eliminate the above-mentioned disadvantages and create a solution which makes it possible, for example, to use centralized charging for billing multimedia services utilizing the existing systems as efficiently as possible.

This goal can be attained by using the solution defined in the independent patent claims.

The basic idea of the invention is to use in the system at least one separate device (called a "billing server"), which, on the basis of the service selected by the customer, negotiates an on-line contract with the customer; or which at least can verify that the customer has accepted the service on defined terms. Billing servers act as points from which the charging records are sent to the actual billing system and, additionally, they can verify the correctness of the charging records created by the customer terminal before storing and/or sending them forward to the billing system. So, in practice the solution is in great extent based on the existing implementation in the telephone network, the difference being that instead of the measuring of service usage and generating of charging records or messages related to them taking place in the network, they take place in the customer's terminal, which sends the charging records to a separate billing server.

A system based on the invention is easy to implement as it utilizes the existing solutions as much as possible. Additionally, the principles of the system are such that it is easy to implement all the factors essential to data security:

authentication, data integrity, non-repudiation (a party to the data transfer cannot deny participation in the transaction) and privacy (an eavesdropper cannot interpret any captured data).

The system also makes it easier for new service providers to start operation, because there is an existing billing solution (i.e. the billing system of the telephone network). They do not need to invest in the implementation of charging.

The system also allows the usage of parallel methods of payment, for example, electronic money can be implemented as an alternative, or parallel payment method in a system based on the invention. Additionally, the system makes it possible to monitor the service level used by the customer. As the monitoring is done in the customer terminal, which also generates the charging records, the process of generating the charging records can react quickly to the changes in the service level. In addition, the system is easily scalable.

The solution is also suitable for use in a mobile or cellular networks, so the usage of services is not geographically limited.

A solution in accordance with the invention can be used in very different communications solutions as it is independent of data transfer protocols and methods.

BRIEF DESCRIPTION OF THE DRAWINGS

In the following, the invention and its preferred embodiments are described in detail referring to the examples 2–10 in the attached figures:

FIG. 3b illustrates the situation corresponding to FIG. 3a when a gateway is used in the network between the billing server and servers providing the services, FIG. 6 illustrates the content and structure of a charging record.

DETAILED DESCRIPTION OF THE INVENTION

In the following, the invention is described in detail referring to the example in FIG. 2, which illustrates a system based on the invention in a typical operating environment.

The system includes customer terminals (CTs), located at customers' premises. These can be, for example, personal computers, mobile stations or separate customer terminals, which are connected to conventional terminal equipment. The terminal equipment may also be integrated, for example, into a modem.

Additionally, the system includes at least one billing server WD, which collects and verifies charging records generated by the customer terminal. The billing server may be located, for example, on the edge of the Internet, in connection with the servers of an Internet service provider ISP. Logically, the location of the billing server has no meaning, but in practice the selection of the location is affected, for example, by the following factors. First, it is advantageous to place the billing server in connection with or near the public telephone network so that it has easy access to the existing billing system of the telephone network. As regards efficiency, it is essential that the connection between the customer terminal and the billing server is as fast as possible and the delay is easily controlled (which is not the case at present, if the billing server is, for example, deep in the Internet). As the purpose of the system is also to provide local service (in a geographically limited area) so that the customers are billed for the services, for example, once a month, it is not sensible to locate the billing server far from the customers.

The billing server includes a memory MS, a magnetic tape for example, which is used for storing all of the charging records the billing server has accepted. The gathered charging records are transferred periodically to the billing system BS, which is an existing billing system in the public service telephone network PSTN, or, for example, a system similar to the existing billing system, but located in a broadband network. Before transfer to the billing system, the charging records can be stored temporarily on a mass memory device MS1.

Additionally, the system includes service providers, which offer those services for which the customers are charged by using the system in accordance with the invention. To simplify FIG. 2, only one service provider is included (SP1). This service provider may offer, for example, Video-on-Demand service via the Internet.

Figure 1:
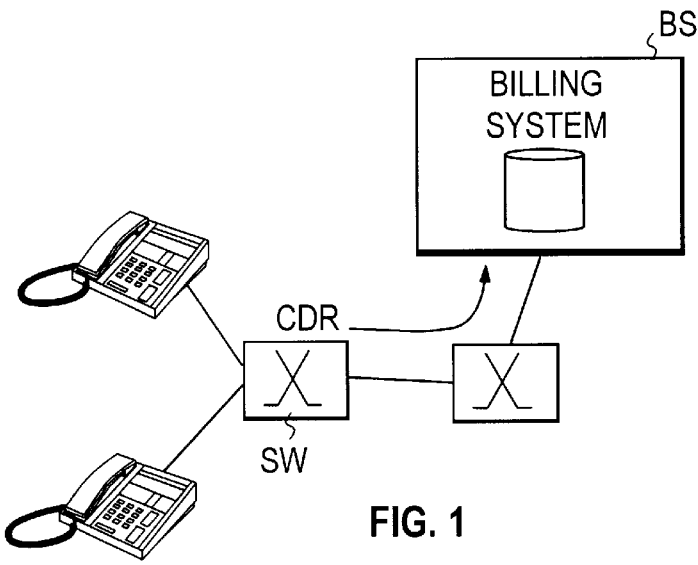
FIG. 1 illustrates a known charging method used in telephone networks.
Figure 2:
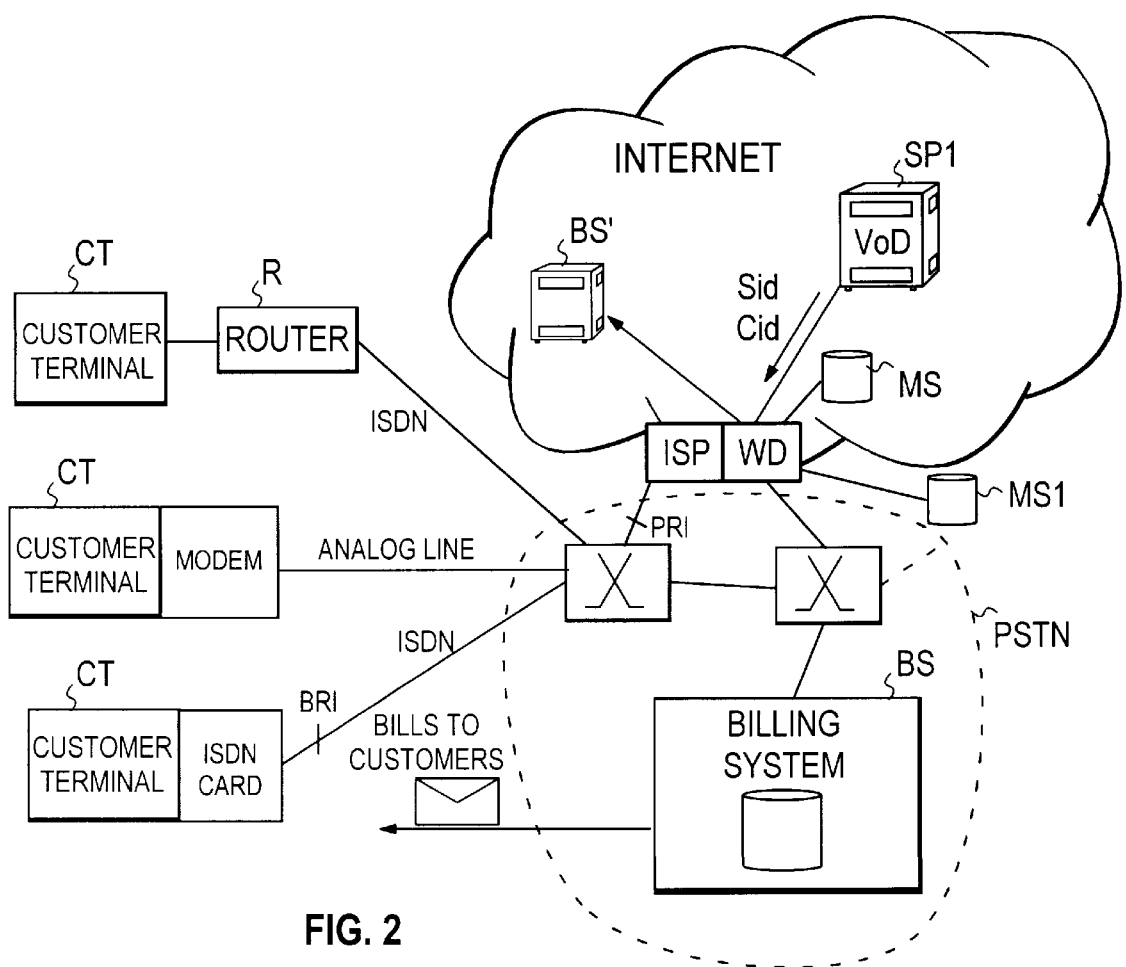
FIG. 2 illustrates the network environment in which the invention is to be used.

The customer terminal (CT), can be connected to the network in different ways as illustrated in FIG. 2. For example, ISDN connections are a possible option. An ISDN connection can be implemented, for example, via a normal router (R) in which case TCP/IP protocol is used over the ISDN connection, or via an ISDN card and an ISDN basic access (BRI). The customer terminal can also be connected to the network switch via a modem and an analog subscriber line. Additionally the current Asymmetrical Digital Subscriber Line (ADSL) and High bit rate Digital Subscriber Line (HDSL) techniques offer new possibilities for fast transfer of data and video in a telephone network twisted pair line to the subscriber terminals. Later on, the system could be used, for example, for ATM connections. The customer terminal can also be located, for example, in a local network of a company or other organization or it can be a cable TV network terminal. An Internet service provider can also connect to the network switch, for example, via ISDN primary access (PRI).

The following describes in more detail the operation of the system in accordance with the invention. The example assumes that the billing service provider is a separate organizational unit, which handles only the billing of services via the billing server WD, which it controls. Thus the billing service provider has its own billing system BS.

Initially, the billing service provider makes a long-term contract with each service provider. In this contract, the billing service provider agrees to monitor the usage of services and to collect the charges for the usage. As compensation for this, the billing service provider may get a certain part of the profit for the services or a fixed fee. As a result of the contract, each service provided by the service provider gets a unique identifier, which is the same both in the billing server (WD) and in the service provider's server (SP1). Additionally, each identifier is given billing parameters, which are used by the billing server. So, in the primary embodiment of the invention the billing server has a database that includes billing parameters for each service identifier of each service provider. As will be described later, this method of implementation can be changed, for example, in a way that the parameters in question are transferred from the server of the service provider to the billing server at the beginning of each session.

After this, the billing service provider makes long-term contracts with customers (those persons who use the services offered by the service providers). Each customer gets a unique customer identifier, which is stored in the billing server and possibly also in the server of the service provider. Additionally, each customer gets a pair of keys consisting of a public key and a private key. This pair is used for signing and signature verification of charging records. The public key of the customer is stored in the billing server and the private key in the terminal equipment. In the primary embodiment, only the customer knows the private key. It is also possible to define a profile for the customer.

The use of service can begin after these long-term contracts are established.

After the customer has selected a service, but before starting the charging, a (short-term) on-line contract is made between the customer and the system. The contract covers only the service the customer has just selected, for example, viewing one movie, or making one purchase. The following explanation refers to FIG. 3a, which illustrates the forming of an online contract. In the figure, the databases connected to the billing server are service, billing and subscriber databases.

The customer terminal CT, includes a service browser (which can be, for example, a Web browser), which the customer uses to find suitable services from the Internet. After finding a suitable service, which in this example is the Video-on-Demand service of service provider SP1, the customer selects the service in question (for example, a movie) by clicking the option, for example. The service selection stage is indicated by arrow A. So at this point the customer terminal and the server of the service provider communicate.

When the customer has made the selection, the server of the service provider sends to the billing server WD, (arrow B) the service identifier "Sid", identifying the movie in question, and the subscriber identifier "Cid" of the customer in question. The Cid is obtained, for example, from the customer's browser on the basis of the source address of the received messages (for example, the socket address of the TCP connection). So the browser is always required to provide the customer identity and address, at least to the billing service provider, but preferably also to the service provider. The subscriber identifier can also be, for example, retrieved from a database on the basis of a password given by the subscriber. This way several different customers can use the services from the same address. It is also possible that there is in the network a separate server, which hides the customer's identity from the service provider, but gives the information to the billing service provider. However, this kind of arrangement is more complicated.

Figures 3A, 4:
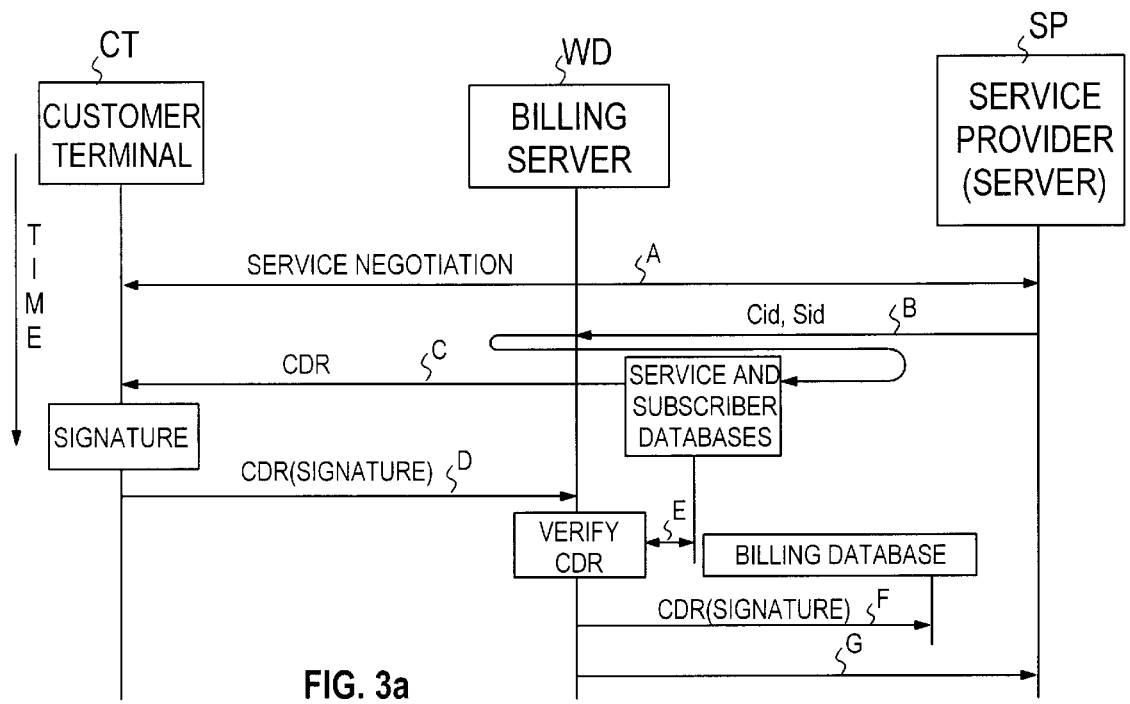
FIG. 3a illustrates the message transfer between the different components of the system before starting the actual charging.
FIG. 4 illustrates the contract window displayed on the customer terminal.

After this, the billing server WD starts a process, which handles the usage of the service in question. First the billing server retrieves from the service database the parameters corresponding to the service in question and sends (arrow C) a certain type of charging record (CDR) to the customer terminal. The charging record contains the billing parameters to be used during the session in question and the contract number. After receiving this initial charging record, the customer terminal program opens a window on the customer terminal, which is from now on referred to as a contract window. FIG. 4 illustrates an example of a contract window using fictional server names. The window displays, on the basis of the information received from the billing service, the basic data about the different parties and the service in question. Additionally, the window displays the contract number, which identifies this particular service session. The difference between this contract and the above-mentioned long-term ones is that this contract is short-term; it concerns only the current service session. So this contract covers only, for example, the viewing of the selected movie. By clicking the Accept button, the customer accepts the service and the basis for the charging of the service. The customer can call off the service by clicking the Cancel button. The customer can also program the terminal to automatically accept the service, for example, in cases where the total price or the price per time unit is less than a predefined value.

As a result of customer acceptance, the customer terminal returns to the billing server the charging record it received from there. However, the charging record to be returned includes a digital signature (FIG. 3a, arrow D). A digital signature refers to a known encryption algorithm based on a pair of keys. The encryption is done using a private key while anybody can decrypt the message using a public key. The confidentiality of the message is lost in this way, but it makes it sure that the message has come from the correct source. So the sender cannot later deny the fact that he/she has sent the message. When using a digital signature, the entire message is normally not encrypted, only the digest formed from the message. The digest is a sort of check sum. From the encryption point of view, this digest is very strong and an outsider cannot create a message, which would have an identical digest. The digest and the time stamp are encrypted by using the sender's private key and these form the digital signature. There are several different known options for implementing the signature, but as the invention is not related to the signing of messages, the implementation of signatures is not described in more detail here. Anyone interested in the matter can find more detailed information from several books describing the field. (For example, see Schneier, Applied Cryptography, ISBN 0-471-11709-9, Wiley & Sons, 1996.)

After this the billing server WD verifies the signature by using a known method in order to authenticate the CDR. For this purpose the billing server retrieves from its subscriber database the public key for the customer in question (arrow E). The billing server stores the accepted charging record into its billing database (arrow F) for some time in case the customer makes a reclamation on the service at a later date. After this the billing server asks the service provider to start sending the information to the customer (arrow G).

The procedure described above can be varied, for example, so that server SP1 sends, after the customer has selected the service, the service identifier and other possibly required information directly to the customer terminal, which sends the service identifier again to the billing server. To prevent the customer from changing the service identifier, the server must add to the message a digital signature, which the billing server recognizes, or the billing server must verify the service identifier separately from the server SP1 after it has received the identifier from the customer terminal. Another variation is to let the server SP1 form the initial charging record, which contains the billing parameters to be used during the service session in question. In this case the billing server only verifies the message and sends it to the customer terminal, or the billing server can add the contract number to the message.

It is also possible to use a separate gateway computer in the network between the billing server and the servers of the service provider. In this case the gateway computer has a list of available services and server SP only contains the actual service information (for example, the video data). FIG. 3b illustrates the formation of the on-line contract when using this option. So in this case the gateway computer GW handles the same operations as the server in the option presented in FIG. 3a. When the gateway computer has received from the billing server a request for sending information (arrow G), it sends the server a starting request (arrow H), which contains the customer terminal address and the service identifier. In this embodiment, an additional checking can be used so that the gateway computer checks separately from the server whether the required service can be delivered to the customer. There may be several reasons for this additional checking, which is marked with a dotted line in FIG. 3b, for example, checking the server load. The billing server and the gateway computer need not be physically separate; they can be integrated into one computer.

The following describes the operation of the method after the online contract has been made by using one of the implementation methods described above.

After the service has begun (for example, the movie has started), the customer terminal sends, for example, periodically, charging records which have digital signatures and which contain information about the amount to be charged. So each CDR to be sent represents charging of a certain time period and the total charge is obtained by summing the charged amounts in all of the charging records that have the same contract number. The time between two consecutive CDRs (and thus the charge for one CDR) may depend on the service provider.

The billing server verifies the origin of each charging record by using the public key of the customer, and stores the accepted charging records to the billing database.

From the billing database the charging records are periodically transferred to the billing system BS (FIG. 2) where they are used to form bills by using a known method. The bills are to be sent to the customers. One bill contains a list and charges for all of the services that the customer has used during the charging period (for example, one month). The bill can be delivered as a printed copy via mail, or in electronic form to the customer terminal. Since the operation of the billing system is known, it is not described in more detail here.

There can be, for example, nine different types (0–8) of charging records (charging messages) in the system as follows:

0. Contract: This is the initial charging record (arrow C, FIG. 3) that the billing server sends (unsigned) to the customer and that the customer terminal returns to the billing server signed, if the customer accepts the contract.

1. Payment: This type of charging records are sent with a signature during a service session from the customer terminal to the billing server, which verifies them.

2. Final: This type of CDR corresponds to type 1 in other respects, but it includes as additional information a statement that it is the last CDR the customer terminal is going to send during the current service session. This type of record is sent, for example, when the customer interrupts the service. It can also be used for one-time charges.

3. Pulse: This type of CDR is sent from the billing server to the customer terminal. The purpose is to tell the customer terminal that it should send a new CDR, if the service is to be continued. If the customer terminal does not send a valid CDR during a specified period, the billing server sends an interruption message to the server of the service provider.

4. Missing sequence number: This is sent from the billing server to the customer terminal (during a continuous billing contract) to notify that a CDR having a certain sequence number has not arrived to the billing server or that the CDR was not valid. In this case the customer terminal can send the CDR again to correct the situation. However, this kind of functionality is not necessary for either party. If the customer terminal does not answer this type of CDR, the best option is that the billing system has no right to charge for the portion of the missing CDR.

5. Modified contract: This type of CDR is sent from the billing server to the customer and it corresponds to type 0 charging records in other respects, but it does not have a new contract number. The contract number is the same as the number of the short-term contract in use at that moment. This charging record is sent during a service session to notify that the billing parameters have changed. The customer terminal can, for example, accept the new contract automatically, if the price has been decreased; in other cases the customer's acceptance may be required.

6. Abort: This type of CDR can be sent in either direction to indicate that the contract is to be terminated. The sender signs the CDR.

7. Digital cash: It is also possible to utilize the billing system in a way that a CDR (type 1 or 2) connected to certain payment includes the payment in digital cash. However, the billing server does not transfer the digital cash into the billing system. The billing server transfers it directly, for example, to the server of the bank (always when it has collected a certain, relatively small, amount of digital cash) or to a network server maintained by some other organization (server BS' in FIG. 2), which charges the customer's account directly. In addition to the centralized billing system BS, digital cash can be used for normal electronic trade or as an alternative implementation instead of a centralized billing system.

8. Synchronization of charging: This is sent from the billing server to the customer terminal (during a continuous billing contract) to inform that the payment CDRs are sent too frequently. In this case the customer terminal can skip one sending of a payment CDR.

Figure 5A:
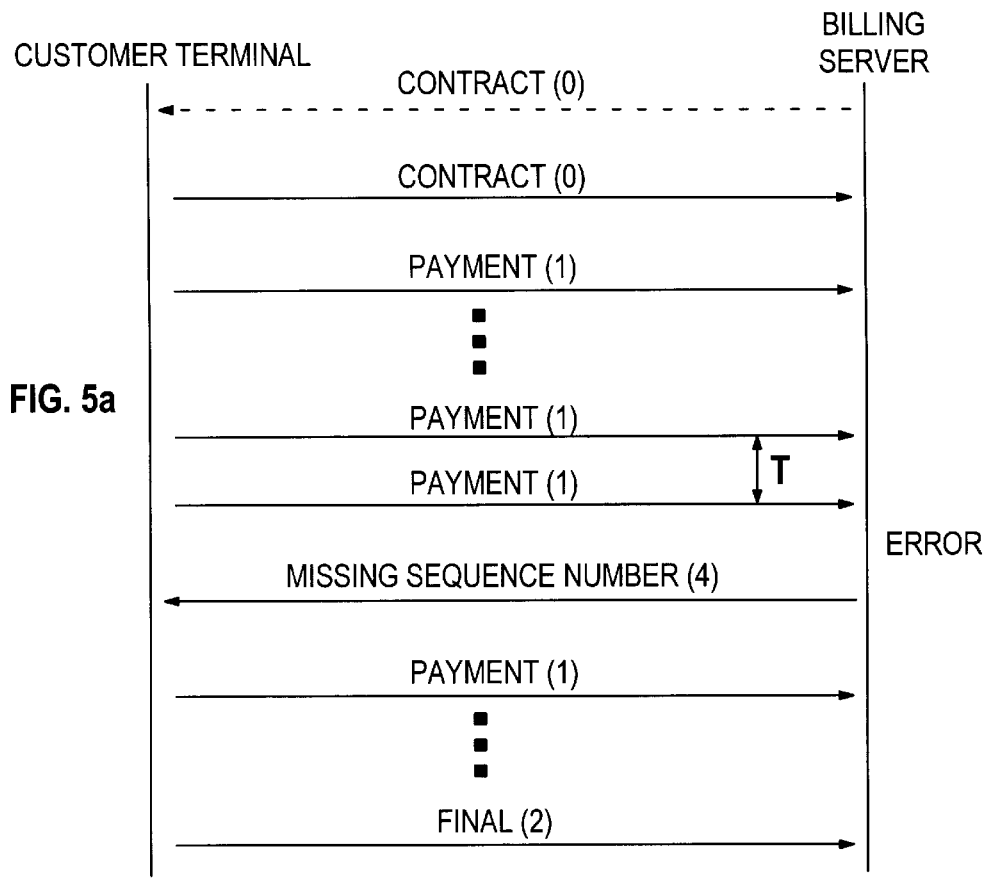
FIG. 5a illustrates an example of message transfer between customer terminal and billing server during one charging session.

FIG. 5a illustrates an example of message transfer between customer terminal and billing server. The type of each message is stated above the arrow representing the message. Messages with digital signatures are shown as continuous lines and messages without digital signatures (only one such message exists and it can also be signed) are shown as dotted lines. The figure illustrates a case in which the billing server notices once during the service that a certain charging record is missing.

Depending on the number of processes executed simultaneously on the customer terminal, the time (T) between two consecutive type 1 CDRs can vary. If the load of customer terminal increases very much and the CDR generation is delayed from the nominal value, the charge included in the CDR is correspondingly greater.

In practice, continuous charging contains a synchronization problem caused by wandering of the customer terminal clocks. As a result it may happen that the customer terminal does not send information at the right rate. This problem can be solved, for example, by letting the billing server accept an "error" of a certain size in the total amount of collected charges (for example, 3 percent). This "error" may be increased by less accurate calculation/rounding off in the customer terminal. If the "error" is increased during a charging session so that it becomes greater than what the billing server can accept, the billing server sends a type 4 charging record having a sequence number, which is the sequence number of the most recent charging record plus one. After this, there are several alternatives for the customer terminal to return the charging record in question. The customer terminal can, for example, be programmed to accept automatically all charging records of this type, which have an amount that is smaller than a certain predefined limit.

Figure 5B:
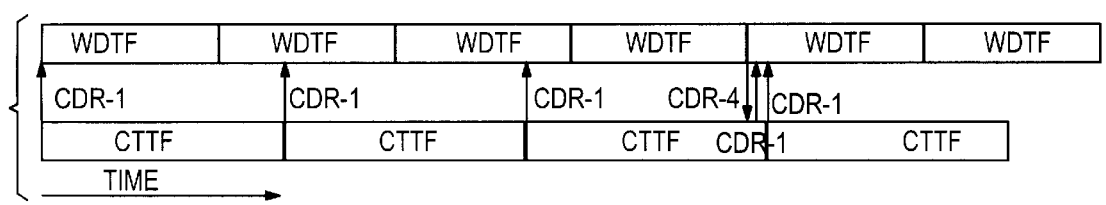
FIG. 5b illustrates a situation in which the clocks of the billing server and the customer terminal are skewed in relation to each other.

FIG. 5b illustrates the situation defined above by presenting consecutive time frames of the billing server with reference mark WDTF and the customer terminal time frames under them with reference mark CTTF. The customer terminal sends at the beginning of each time frame a payment CDR (type 1). When there is a time frame in the billing server for which there is no payment, the server sends a type 4 CDR. In this case, the customer terminal answers automatically by sending a payment CDR and right after that the following payment CDR when the next customer terminal time frame begins.

If the customer terminal clock is too fast, the customer terminal sends at some point two payment CDRs during one billing server time frame. This kind of situation can be corrected, for example, in a way that the billing server sends an extra message to the customer terminal. This extra message is the logical opposite of the type 4 CDR. After receiving the extra CDR, the customer terminal skips one payment CDR. For this purpose, a separate CDR type is required (type 8).

All charging information required in the system is transferred in the consecutive fields of protocol messages (charging records). FIG. 6 illustrates the fields used in the charging records:

TYPE: States the type of the CDR, that is, which one of the eight above-mentioned charging records is in question.

LENGTH: This field states the total length of the CDR in bytes, including type and length fields.

CONTRACT NUMBER: This field includes an integer number given by the billing server. The number is the same for all CDRs, which belong to the same charging session.

SEQUENCE NUMBER: An integer number, which states the generating order of the CDRs during the same charging session. The customer terminal gives number 0 to the contract CDR (type 0) it returns. After this it increases the number by one for each CDR. This field is not defined in CDR types 3, 5, 6 and 7, and in type 4 it indicates the sequence number of a missing CDR.

SERVICE IDENTIFIER: The contents of this field state the service for which the customer is charged. The parameter in this field obtains its value as a result of a contract between the billing service provider and the (multimedia) service provider.

SERVICE TYPE: The parameter in this field categorizes the services in different classes for statistical purposes. For example: Web pages, Video-on-Demand, file transfer, etc.

STARTING TIME: The parameter in this field shows the current time for CDR types 0 and 5 and also 3, 4 and 6, and the starting time of the charging period for types 1 and 2.

ENDING TIME: The parameter in this field defines the ending of the charging session for CDRs of type 1 and 2. For CDRs of type 0 and 5, the difference between the starting and ending times is the maximum charging period acceptable. In CDRs of other types this parameter is not defined.

IDENTIFIERS: The parameter in this field states the customer, billing server and server identifiers. The identifiers can be integer numbers or network addresses, but they must be unique within the billing system.

METHOD OF PAYMENT: The parameter in this field is defined for CDRs of type 0, 5, 1 and 2. The methods of payment may be categorized, for example, as follows: free, one-time charge (one CDR), periodical or eternally triggered, that is, another process in the customer terminal may trigger it. For example, the customer terminal video player can trigger the CDR generation once a minute, if acceptable video signal has been received during the most recent minute.

AMOUNT OF MONEY: This field states the customer's debt (either for the entire session or for a time period between two CDRs).

TRAFFIC DATA: This field contains information sent from the customer terminal's external application to the customer terminal and further to the network.

SIGNATURE: This field contains the customer's digital signature, which is used for the authentication of the CDR.

In the Appendix 1, enclosed in this application, the CDR structure is described in more detail by using the Abstract Syntax Notation 1 (ASN.1), which is a common description language used in telecommunications for describing data structures. Abstract syntax description language and the corresponding transfer syntax, which is a set of instructions for presenting as a bit stream the data structures described by using a description language, are defined in the ISO 8824 standard.

Charging records can be sent, for example, in the data field of IP packages, which may contain one or several charging records.

Figure 7A:
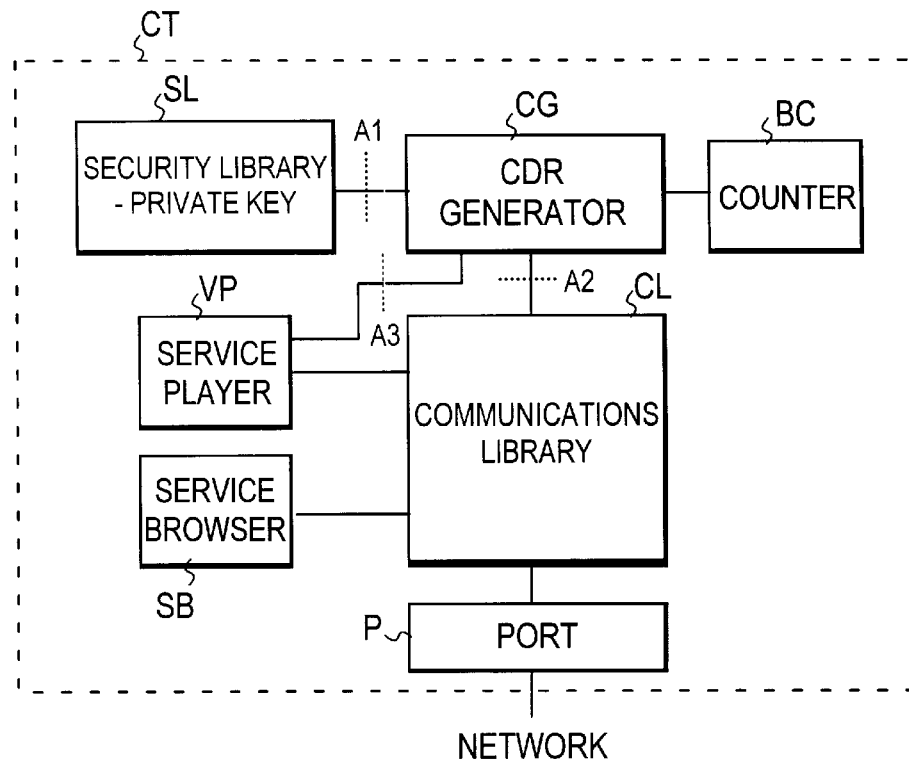
FIG. 7a illustrates the structure of the customer terminal as a functional block diagram.

FIG. 7a illustrates the operation of the customer terminal (CT) as a functional block diagram. As regards the invention, the core of the equipment is the CDR generator (CG), which generates charging records. Connected to the CDR generator is the security library (SL). Its memory contains the customer's private encryption key and it handles the signing of the charging records. The CDR generator creates the CDRs and sends them to the security library where they are signed by using the customer's private encryption key. The security library returns the signed CDRs to the CDR generator, which sends them to the billing server (WD).

If the application or the environment is such that encrypted messages must be transferred between the customer terminal and the billing server, the security library handles the encryption, signing and signature verification.

The security library can be implemented as a hardware based, or a software based solution. However, the hardware based solution is faster. The security library, or part of it, can be implemented, for example, by using a smart card, which contains, for example, the private encryption key of the customer.

Additionally, the customer terminal contains elements for receiving the service. These can include, for example, a service player VP, which can be a video player, which shows the video signal received from the network and which can also give the CDR generator commands for generating the charging records. The service browser SB, the service player VP and the CDR generator are connected to the network via the communications library CL of the terminal. The CL forms the protocol stack according to which the customer terminal operates. This protocol stack can be, for example, a TCP/IP stack, for example, Microsoft Winsock.

The customer terminal can also contain a billing counter BC, which the customer can use to check the accuracy of the bill sent by the service provider. Additionally, the customer terminal can have different components for monitoring the quality of service (QoS) of the received information. For example, a video player can order the source to stop transferring information when the quality of service falls below a certain level.

Figure 7B:
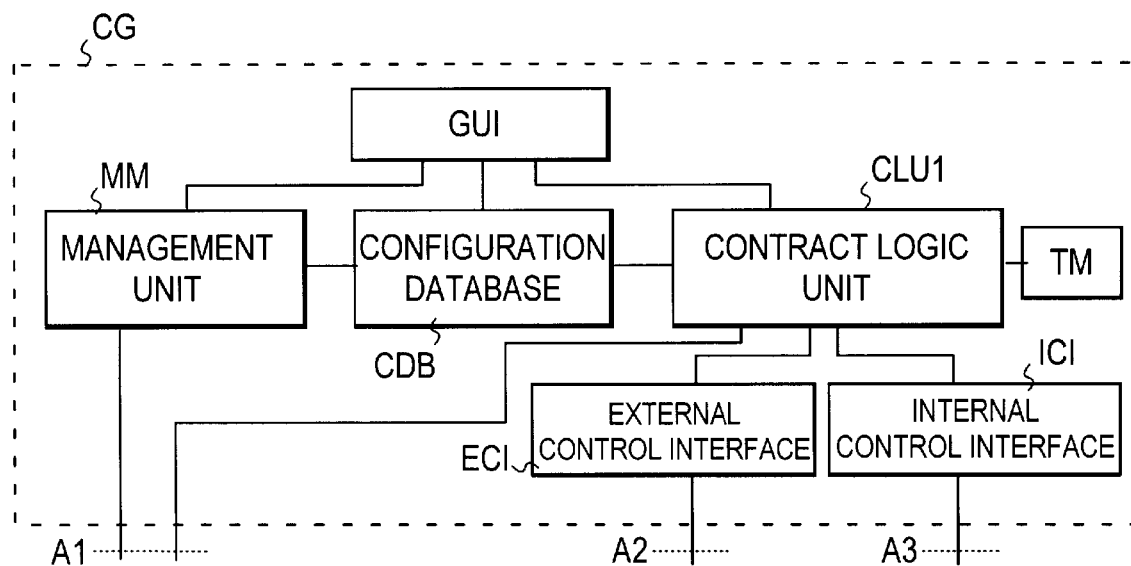
FIG. 7b illustrates in detail the structure of the CDR generator shown in FIG. 7a, FIG. 8 illustrates the structure of the billing server as a functional block diagram.

FIG. 7b illustrates in more detail the functional block diagram of the CDR generator. The contract logic unit CLU1 handles the generation of charging records on the basis of information stored in the configuration database CDB. It contains the logic, which transfers the received contract information to the graphical user interface GUI and generates the kind of charging records defined above. This logic includes timing components, which define the time between two consecutive CDRs. The contract logic unit CLU1 is connected to the communications library and the network via an external control interface ECI and to the service player via an internal control interface ICI. The external control interface makes the conversion between the internal and external CDR format. The internal control interface handles message transfer between the service player and the contract logic unit and makes the necessary conversions between the message format used by the service player and the internal message format of the equipment. The connection between the internal control interface and the service player (interface A3) can be implemented, for example, by using a communications library (TCP socket). The configuration database CDB is used for storing the settings the user has made (user preferences) and it can be used for storing information about different services (for example, movies), which are presented to the customer on the basis of the received service identification. This database can be implemented, for example, by using Microsoft Access or Borland Paradox. The configuration database is controlled using the management unit MM. The management unit, the configuration database and the contract logic unit are all connected to the graphical user interface (GUI) of the device. The GUI can be implemented by using, for example, Java applets or Microsoft Visual Basic programming tools. (Java applets are small program packages, which are transferred to the user's computer when the user opens a Web page containing applets.) Note that part of the configuration database can be located in the network.

If the service player is designed, for example, for Video-on-Demand, it can be implemented, by using a personal computer and a program designed for Video-on-Demand services. One such program is StreamWorks, which is produced by Xing Technology Inc., USA.

The management unit and the contract logic unit are connected to the security library via the A1 interface. The security library and the A1 interface can be implemented, for example, by using the SETCOS 3.1 smart card produced by Setec Oy or by using some equivalent product, which is based on international standards on smart cards.

The data transfer methods used in the implementation of the method vary according to the type of network and the method used for connecting the customer terminal to the network. If the customer terminal is connected to the network, for example, via a router (IP channel), the charging records can be sent in TCP frames. If the customer has, for example, an ISDN connection (2B+D), the CDRs can be sent in the ISDN signalling packets (User-to-User messages) on the D channel or, for example, a TCP connection can be implemented on one of the B channels. The charging records can also be sent, for example, in the TCAP messages of an SS7 network. The essential part as regards to the data transfer is only that between the customer terminal, the billing server and the server there is the required connectivity, which makes it possible to transfer the messages defined above.

The method of transferring information from the service provider to the customer is not described above as it is not directly related to the invention. The information can be transferred in packets (as is done in the Internet at the present) or dedicated connections (either fixed or virtual) can be used for the transfer. Some service—Video-on-Demand, for example—may require a dedicated connection between the customer and the server. The network operator may charge these connections separately, but if a certain charge for the usage of these connections is to be included in the bill in the system in accordance with the invention, the CDRs generated by the network switches must be collected. In this case it would to advantage if these CDRs contained the contract number, because then the price of connections could be related to the service which caused the forming of the connection. So it is beneficial that the calling party sends the contract number to the switch. This can be done, for example, by using the control messages related to the forming and disconnecting of the connection (connection through which the service is implemented). The connections and use of service can also be connected to each other by using time stamps in the CDRs.

Figure 8:
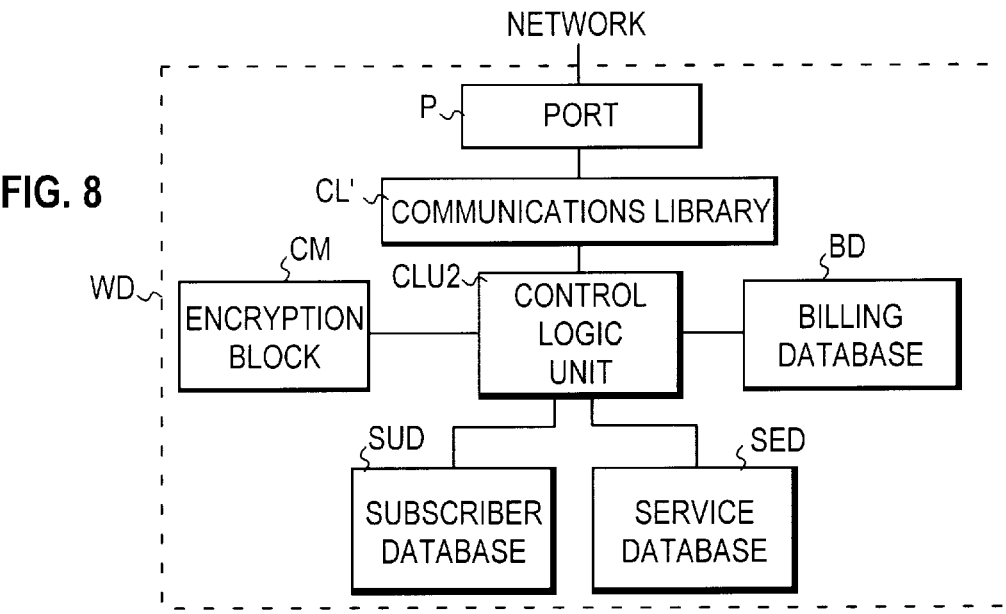

FIG. 8 illustrates the structure of the billing server WD as a general level block diagram. The core of the equipment is the contract logic unit CLU2, which has access to the service database SED, the subscriber database SUD and the billing database BD. The service database contains information about the services of different service providers and the parameters for charging for the use of the services. The billing server can also change the charging parameters independently, for example, on the basis of the time of the day. The subscriber database contains the customer data for the operator managing the billing server (including the public key of each customer). The charging records received from the customer terminal are stored in the billing database. An encryption block (CM) is associated with the contract logic unit. The CM handles the verification of the charging record signatures. This block corresponds to the SL block of the customer terminal. The contract logic unit receives from the customer terminals charging records signed by the customer terminals and sends them to the encryption block to be verified. The contract logic unit stores the accepted charging records to the billing database. The contract logic unit is connected to the network through the communications library (CL'), which forms the protocol stack defining the connection to be made.

In practice, the contract logic units described above can be implemented, for example, by using tools based on the international System Description Language (SDL) standard, for example, the SDT tool of Telelogic AB.

The databases of the billing server can be in the memory MS described above (FIG. 2) and located in connection with the billing server. In addition, the charging records can be stored in a separate mass memory MS1 (FIG. 2), which is between the billing server and the billing system in the network and which is organized in such a manner that the billing system can easily handle the information stored in it. By using this kind of separate database it is possible to let the service providers use the database for different kinds of queries in order to improve their services. The service provider, or a customer can, for example, ask about the charging of a certain service during a charging period (for example, by using e-mail).

The subscriber and service databases can be both in the billing server and in the service provider's server (the latter can use them, for example, for data authentication). These databases can be maintained by different organizations and they do not need to be identical. For example, free services do not need to be stored in the billing server database. Also, the subscriber and service records in the databases need not be identical. Only those subscriber and service identifiers that the server providing the service sends to the billing server must be identical.

The billing server can consist of several parallel server units and known load distribution principles can be used in connection with them, for example, by equipping them with a common load sharing unit, which distributes the service requests between the parallel units in a certain way.

Figure 9A:
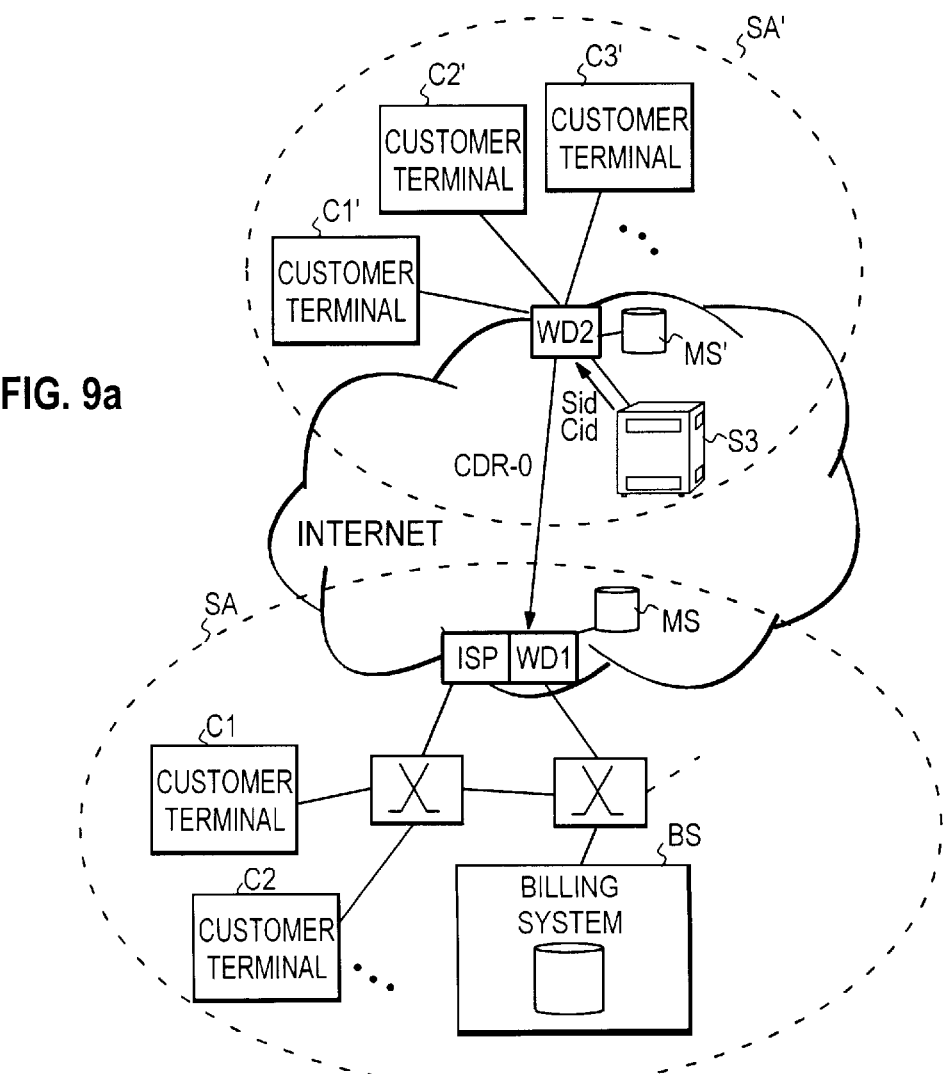
FIG. 9a illustrates a case in which the customer uses services from a server, which does not belong to the area managed by the customer's own billing server.
Figure 9B:
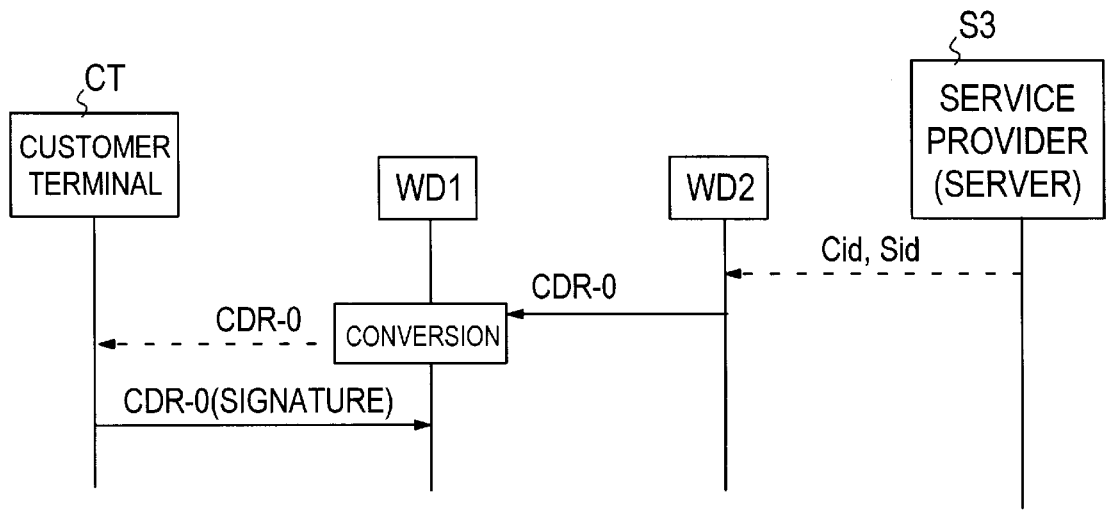
FIG. 9b illustrates the message transfer between the billing servers in the case presented in FIG. 9a, and FIG. 10 illustrates an example of message transfer when the customer terminals are located in a cable TV network.

A service provided by utilizing the invention is meant to be local in the respect that one billing server handles a certain group of customers, which are located in a geographically limited area. FIG. 9a illustrates areas SA and SA' managed by two different billing servers, WD1 and WD2. Naturally, it is possible for a customer of a certain billing server to use services from a server, which is located in the area managed by a different billing service provider (and thus, a different billing server), for example, in another city or country. FIG. 9a illustrates this kind of situation, in which customer C1, located in the area managed by billing server WD1, contacts server S3, which has an agreement with the billing service provider managing the billing server WD2. FIG. 9b illustrates the transfer of messages.

When the billing server WD2 receives the customer identifier (Cid), (or the address) and the service identifier Sid from the server S3, it notices that the customer in question is not one of its own. In this case, the billing service providers must make a mutual contract so that the billing server WD2 can send, after receiving the customer and service identifiers from the server S3, the initial CDR (contract CDR) to the billing server WD1. The latter (i.e. WD1) converts the billing server specific information (billing server identifier and contract number) to correspond with its own information and, after this, sends the initial CDR to the customer in question. The contract CDR received from the billing server WD2 is linked to the contract CDR sent to the customer by storing in the billing server WD1 an "empty" CDR, which is otherwise the same as the signed contract CDR received from the billing server WD2, but the service identifier has been replaced by the contract number, which the billing server WD1 uses for identifying the service in question. This way the billing server WD1 knows that the service originates from a service provider, which has a contract with another billing service provider.

After this, the billing server WD1 can collect the CDRs resulting from the use of the service. So the situation is similar to what happens when the customer places an international call.

Locally collected CDRs can either be processed in the local billing system or they can be sent to the billing service provider, who owns the billing server WD2. In the telephone network the CDRs are processed and the billing is usually handled in the local system. The portion of the billing belonging to the other operator is returned to them later.

The example above shows that the method in accordance with the invention can be extended worldwide by delegating the making of an on-line contract to the local billing server and by using the same management methods as in public telephone network.

By adding to the system home and visitor registers similar to those in the mobile communications networks, it is possible to implement the same roaming properties as in mobile communications networks. In this case it is essential that the customer's public key can be safely transferred to the billing server near the subscriber so that the billing server in question is able to verify the charging records. (If the transfer cannot be done safely, it is possible that a third party may change the key during the transfer and in this way cause expenses to the original subscriber.) The subscriber's public key can be transferred, for example, into a database (VLR, Visitor Location Register) near the billing server into which the billing server has access. The billing server nearest to the roaming subscriber can handle the billing by using the identifier of the subscriber's own billing server. The collected CDRs are sent to the subscriber's own billing server after the service session has ended.

A customer terminal can be, for example, a normal mobile station into which the properties required by the invention have been added, and the invention can be used in a mobile phone network or mobile communications network.

If the customer terminals are in a cable TV network, the service, for example, playing a video, can be implemented as described below. Because a cable TV network is a broadcast network, in which all customers receive the same signal, the server encrypts the video signal it sends by using a key, which it changes frequently, for example, every 5–10 minutes. Every time the server changes the key, it informs the billing server of the key and the billing server gives the new key to the customer terminal after receiving a corresponding payment from the customer terminal.

Figure 10:
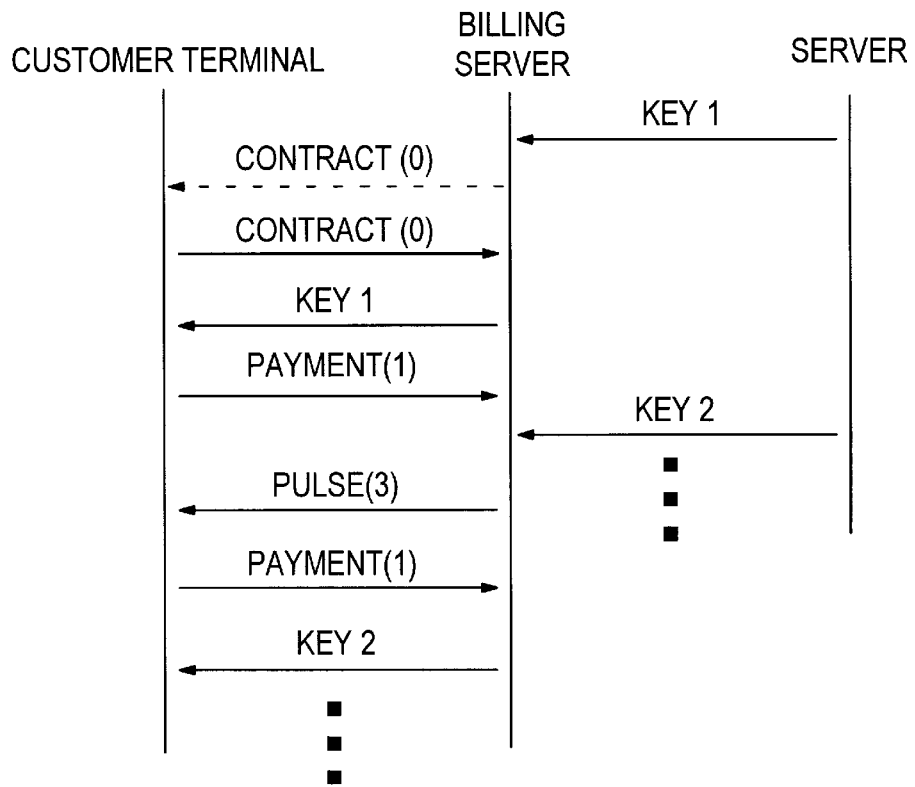

FIG. 10 illustrates the payment of a charge in the case that the customer terminals are cable TV network terminals. As a result of making a contract, the billing server gives the customer terminal the first key, which it has received from the server providing the service. The billing server sends periodically a type 3 charging record (pulse) to the customer terminals; in this way it asks for a new payment. As a response to the payment the billing server sends a new key, which is has received from the server providing the service. The key can be sent, for example, in a CDR of separately defined type (type 9), in which it can be placed, encrypted by using the user's public key, to the signature field. The encryption can be implemented when there is a risk that an outsider could copy the key. The key is sent only to those customer terminals from which a payment CDR has been received. The service provider does not need to send one key at a time to the billing server; all keys can be sent together. Also, there is no need to make a separate contract with the customer by using CDRs of type 0. Instead, the sending of the first key can act as a proposal for an on-line contract from the side of the system and the first payment CDR can act as an acceptance of that contract from the side of the customer. After this, the service session is given a contract number.

The cable TV application can also be implemented without charging records of type 3. In this case the key is sent to each customer terminal as a response to the payment CDR sent by the terminal.

Although the invention has been described here in connection with the examples shown in the attached figures, it is clear that the invention is not limited to these examples as it can be varied in several ways within the limits set by the included patent claims. The following describes briefly some possible variations.

For example, it is possible that the customer terminal does not send actual charging records to the billing server, but it sends some other messages, which the billing server can use as a basis of generating the charging records. For example, the customer terminal can send so called keep-alive messages as long as the service lasts, after which the billing server generates a charging record in which the duration of the service is the time between the last keep-alive message and the time of accepting the contract. Charging record(s) can also be generated in the billing server after the customer terminal has notified of the acceptance of the selected service on defined terms.

In the system described above, the service produced by the service provider consists of sending information. In principle, nothing prevents the service from consisting of a delivery of physical goods (for example, via postal services) to the customer. In this case the charging record(s) could be generated in the billing server (as the customer terminal cannot meter the quality of the service).

If the connection between the customer and the billing server is secure enough, it could be unnecessary to include a digital signature in the charging records. Also, sending a separate acceptance message for the online service to the billing server is not necessary as the first payment CDR can act as an acceptance of the on-line service from the part of the customer. So, the only essential factor is that some message notifies the billing server that the customer has accepted the contract.

It also possible that the on-line contract is first made between the billing server and the customer and only after that the server of the service provider is contacted.

The service can also be implemented as a service session into which more than one server participate in addition to the customer terminal. One server can send to the customer terminal, for example, a video signal while another server sends simultaneously additional information related to the video signal, such as text or charts.

If the servers mentioned above have different owners, the payment can be divided between them in several ways. For example, the billing system can calculate the shares of the service providers when it forms the monthly bills. Another solution is that the billing server distributes the payments right away as follows: for each payment CDR received from the customer terminal, the billing server creates, for example, two new CDRs, which it signs and stores into the mass memory. One of these charging records contains the payment for the video service and the other for the data service. The sum of these payments is the amount of money in the charging record, which was received from the customer terminal. The method of dividing this amount between the service providers is one of the parameters for the combined service which are stored in the service database. If several servers participate in the same service session, the billing server can correspondingly divide the amount of money received from the customer into several charging records. In addition to being able to divide the payments between the service providers by generating new CDRs, the billing server can also take its share right away. So, if there are N number of simultaneous service providers, the billing server can divide each received payment CDR into N+1 portions for the new charging records in a way that each service provider and the billing service provider get their share.

APPENDIX 1

```
-- The CDR structure
-- =================
-- In the initial version the encoding is byte-oriented
-- without tag and length fields. ENUMERATED is encoded
-- as one octet if nothing else is specified, INTEGER
-- is encoded as an octet string (length 2, 4 or 8 depending
-- on the maximum size) in MSB first format.
CDR_cdrType ::= ENUMERATED {
    contract      (0), -- initial CDR, WD --> Client
    payment       (1), -- normal payment CDR
    final         (2), -- a above, client stops
    pulse         (3), -- indication of new payment
    missing_seq   (4), -- CDR with seq.num. lost
    mod_contract  (5), -- contr. renegotation
    abort         (6), -- end connection, no money inc.
    E_cash        (7) -- e_cash carrier CDR, type B
}
-- Types 0..6 are overloaded onto a CDRtypeA, type 7 uses
-- a CDRtypeB
CDR_network ::= ENUMERATED {
    unknown    (0),
    TCP/IP     (1),
    ISDN       (2)}
CDR_serviceTypeType ::= ENUMERATED {
    unknown    (0),
    . . .
}
CDR_timeType ::=
    hundrethOfSec   OCTECT STRING (SIZE(1)),
    seconds         OCTET STRING (SIZE(1)),
    minutes         OCTET STRING (SIZE(1)),
    hours           OCTET STRING (SIZE(1)),
    days            OCTET STRING (SIZE(1)),
```

APPENDIX 1-continued

```
    year_lo    OCTET STRING (SIZE(1)),
    year_hi    OCTET STRING (SIZE(1))}
CDR_identifierType ::= SEQUENCE {
    type    ENUMERATED {system_assigned(0), E164_addr(1), ... }
    data    OCTET STRING (SIZE(16))
}
CDR_paymentMethodType ::= ENUMERATED {
    free       (0), -- no charge
    one_time (1), -- agreement valid for one payment
    periodic (2), -- time-based
    wd_req (3), -- payment triggered by a WD msg
    ext_trig (4) -- paym. trigg. by an extern. client. appl.
}
CDR_currencyType ::= ENUMERATED {
    majorType   ENUMERATED {bill(0), E_cash(1)},
    currency    ENUMERATED {FiM (0), USD(1), ... }
}
-- encoded in one octet so that major Type occupies
   the most significant bit and currency bits 0-6
CDR_moneyAmountType ::= SEQUENCE {
    currency   CDR_currencyType,
    value      INTEGER(0..MAX_WORD)
-- in case E_cash is used, the value defines the
-- sequence number of the E_cash carrier CDR
CDR_signatureType ::= SEQUENCE {
    present   ENUMERATED {absent(0), present(1)},
    type      ENUMERATED {RSA-with-MD5(0), DES-with-MD5(1)},
    signature OCTET STRING SIZE (64)
}
CDRformatA ::= SEQUENCE {
    type         CDR_cdrType,
    length       INTEGER (0..MAX_S_WORD),
    contractNr   INTEGER (0..MAX_WORD),
    sequenceNr   INTEGER (0..MAX_WORD),
    serviceId    INTEGER (0..MAX_D_WORD),
    serviceType  CDR_serviceTypeType,
    startTime    CDR_timeType,
    endTime      CDR_timeType,
    clientId     CDR_identifierType,
    watchdogId   CDR_identifierType,
    serverId     CDR_identifierType,
    payMethod    CDR_paymentMethodType,
    moneyAm      CDR_moneyAmountType,
    trafficData  OCTET STRING (SIZE(8))
    signature    CDR_signatureType
}
CDRformatB ::= SEQUENCE {
    type         CDR_cdrType,
    length       INTEGER (0..MAX_S_WORD),
    contractNr   INTEGER (0..MAX_WORD),
    sequenceNr   INTEGER (0..MAX_WORD),
    e_cash       OCTET_STRING(SIZE(0..200))
}
```

What is claimed is:

1. A method for implementing charging in a telecommunications network including customer terminals, used by customers for ordering services, servers for offering services to the customers, and billing means for forming bills to the customers, the method comprising the steps of:

providing the network with at least one separate billing server in such a way that each customer terminal is assigned a billing server;

selecting a service by means of the customer terminal;

sending, in response to selection of the service, information identifying at least the customer who made the selection and the selected service from the server providing the service to a predefined billing server of the network;

negotiating terms of the service with the customer terminal;

making a delivery in accordance with the selected service to the customer;

generating at least one charging record (CDR) in the customer terminal when the customer accepts the terms of the service;

sending the at least one charging record generated by the customer terminal to a billing server; and using the billing servers to transfer the at least one charging records to the billing means in such a way that at least one predefined billing server participates in transferring the at least one charging record of the selected service, regardless of which one of the servers offers the service.

2. A method according to claim 1, wherein negotiating terms of service includes sending a contract message via the network to the customer terminal to notify the customer to make a contract concerning the selected service, and returning a customer's acceptance of the contract as a separate accepting message from the customer terminal via said network to the billing server.

3. A method according to claim 2, further comprising introducing an identifier for identifying the accepted contract into said at least one charging record.

4. A method according to claim 2, further comprising sending the charging records generated in the customer terminal from the customer terminal directly to the billing server assigned to that customer terminal.

5. A method according to claim 2, wherein the contract message includes information about charging parameters for the selected service, whereby the customer terminal generates charging records in accordance with the received charging parameters.

6. A method according to claim 1, wherein the charging records generated in the customer terminal are provided with digital signatures, which are verified by the billing server.

7. A method according to claim 1, further comprising sending, in response to selection of the service, information identifying at least the customer who made the selection and the selected service from the server providing the service via the customer terminal to the billing server assigned to the customer terminal.

8. A method according to claim 1, further comprising sending, in response to selection of the service, information identifying at least the customer who made the selection and the selected service from the server providing the service via the network directly to the billing server assigned to the customer terminal.

9. A method according to claim 7, wherein the server provides the information transferred with a digital signature, and the billing server identifies the information transferred with a digital signature and received from the customer terminal.

10. A method according to claim 5, further comprising sending the charging parameters of the service to the customer terminal as an unsigned charging record message (CDR) containing the charging parameters to be used.

11. A method according to claim 10, further comprising returning, in response to the customer's acceptance of the contract, the received charging record from the customer terminal to the billing server of the network as a digitally signed message.

12. A method according to claim 11, wherein the billing server gives to a service providing server, in response to reception of said charging record, a command to start service delivery.

13. A method according to claim 12, wherein the command to start the delivery of the service is given to a server other than the server used for service selection.

14. A method according to claim 1, further comprising storing the charging records both in a memory associated with the billing server and in a network mass memory providing temporary storage for the charging records before being transferred to the billing means.

15. A method according to claim 1, further comprising sending the information identifying the customer who made the selection and the selected service from the server to a predefined first billing server and forwarding the information from the predefined first billing server to the billing server assigned to the customer terminal.

16. A method according to claim 1, further comprising sending the charging records from the customer terminal to the nearest billing server for storage and sending the charging records stored on the nearest billing server to the billing server assigned to the customer.

17. A method according to claim 1, further comprising generating a charging record at telecommunications network switches and, within the framework of a single contract, collecting the charging records generated by both the customer terminal and telecommunications network switches.

18. A method according to claim 1, wherein making the delivery in accordance with the selected service comprises sending information to the customer terminal simultaneously from several network servers.

19. A method according to claim 1, further comprising generating new charging records from the charging records received by the billing server for sending to the billing means.

20. A method for implementing charging in a telecommunications network including customer terminals, used by customers for ordering services, servers for offering services to the customers, and billing means for forming bills to the customers, the method comprising the steps of:

providing the network with at least one separate billing server in such a way that each customer terminal is assigned a billing server;

selecting a service by means of the customer terminal;

negotiating terms of the service with the customer terminal;

making a delivery in accordance with the selected service to the customer;

generating at least one charging record (CDR) in the customer terminal when the customer accepts the terms of the service;

generating a charging record at telecommunications network switches;

collecting the charging records generated by the customer terminal and the network switches;

sending the charging records generated by the customer terminal and the network switches to a billing server; and using the billing servers to transfer the charging records to the billing means in such a way that at least one predefined billing server participates in transferring the at least one charging record of the selected service, regardless of which one of the servers offers the service.

21. A method for implementing charging in a telecommunications network including customer terminals, used by customers for ordering services, servers for offering services to the customers, and billing means for forming bills to the customers, the method comprising the steps of:

providing the network with at least one separate billing server in such a way that each customer terminal is assigned a billing server;

selecting a service by means of the customer terminal;

negotiating terms of the service with the customer terminal;

making a delivery in accordance with the selected service to the customer, including sending information to the customer terminal simultaneously from several network servers;

generating at least one charging record (CDR) in the customer terminal when the customer accepts the terms of the service;

sending the at least one charging record generated by the customer terminal to a billing server; and using the billing servers to transfer the at least one charging records to the billing means in such a way that at least one predefined billing server participates in transferring the at least one charging record of the selected service, regardless of which one of the servers offers the service.

22. A method according to claim 21, further comprising generating new charging records from the charging records received by the billing server for sending to the billing means.

23. A system for implementing charging in a telecommunications network including servers for offering services to customers, the system comprising:

customer terminals connected to the network for selecting the services from the servers, at least one separate billing server connected to the network, a billing server being assigned to each customer terminal, means for generating charging records in response to the service provided to the customer, said means being adapted to the customer terminals for sending the generated charging records via the network to a pre-defined billing server; and a billing system connected to the network for receiving the charging records;

wherein the billing servers handle the transmission of charging records to the billing system and at least one of the customer terminals includes a service player connected to the means for generating charging records, for stopping the generation of charging records when the quality of the signal received by the service player falls below a pre-determined level.

24. A system according to claim 23, wherein the customer terminal includes means for adding a digital signature to the generated charging record, and the billing server includes means for verifing the digital signature.

25. A system according to claim 23, wherein each customer terminal and respectively assigned billing server include interactive elements, whereby the billing server commands the customer terminal to open a contract window dialog box to present information about a service and an acceptance button for accepting a contract for the service, and the customer terminal sends, in response to activation of the acceptance button, contract information and a signature to the billing server.

26. A method according to claim 1, wherein said pre-defined billing server is the same as said assigned billing server.

27. A method according to claim 1, wherein said pre-defined billing server is a server other than said assigned billing server.

28. A system according to claim 23, wherein said pre-defined billing server is the same as said assigned billing server.

29. A method according to claim 23, wherein said pre-defined billing server is a server other than said assigned billing server.

* * * * *